United States Patent
Shin (10) Patent No.: US 11,087,425 B2
(45) Date of Patent: Aug. 10, 2021

(54) ROBOT AND SERVICE PROVIDING METHOD THEREOF

(71) Applicant: LG ELECTRONICS INC., Seoul (KR)

(72) Inventor: Jongcheol Shin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 165 days.

(21) Appl. No.: 16/555,639

(22) Filed: Aug. 29, 2019

(65) Prior Publication Data
US 2019/0385267 A1 Dec. 19, 2019

(30) Foreign Application Priority Data
Aug. 5, 2019 (KR) ........................ 10-2019-0094826

(51) Int. Cl.
| | |
|---|---|
| *G06K 9/62* | (2006.01) |
| *G06T 1/00* | (2006.01) |
| *G06Q 20/20* | (2012.01) |
| *G06Q 30/06* | (2012.01) |
| *G06K 9/00* | (2006.01) |
| *G06T 7/55* | (2017.01) |
| *G06T 7/73* | (2017.01) |

(52) U.S. Cl.
CPC ........ *G06T 1/0014* (2013.01); *G06K 9/00369* (2013.01); *G06K 9/00664* (2013.01); *G06K 9/00771* (2013.01); *G06Q 20/20* (2013.01); *G06Q 30/0631* (2013.01); *G06T 7/55* (2017.01); *G06T 7/74* (2017.01); *G05B 2219/50391* (2013.01); *G06T 2207/30196* (2013.01); *G06T 2207/30232* (2013.01)

(58) Field of Classification Search
CPC ......... G06T 1/0014; G06T 2207/30232; G06T 2207/30196; G06K 9/00664; G06K 9/00691; G06K 9/00771; G06K 9/00335–9/00355; G06K 9/00362–9/00369; G06Q 30/0631
See application file for complete search history.

(56) References Cited

U.S. PATENT DOCUMENTS

| | | | |
|---|---|---|---|
| 2018/0043542 A1* | 2/2018 | Mascorro Medina | G06Q 30/016 |
| 2018/0308052 A1* | 10/2018 | Fain | G07C 5/02 |
| 2020/0104593 A1* | 4/2020 | Zucker | G06N 3/0454 |

* cited by examiner

*Primary Examiner* — Brian Werner
(74) *Attorney, Agent, or Firm* — Birch, Stewart, Kolasch & Birch LLP (57) ABSTRACT

Provided are a robot and a service providing method performed by a processor included in the robot. The provided robot calculates clothing information of a first user who is in the space, location information of the first user in the space, and space entry time information of the first user on the basis of at least one of images of an internal space, sound generated in the internal space, and information of the internal space, determines whether the first user is a guest or a host based on the calculated information, determines whether the first user who has been determined as the guest is a first guest who stays in the space for a short time period or a second guest who stays in the space for a long time period, and determines a type of service provided by the robot based on a result of the determination.

16 Claims, 6 Drawing Sheets

ROBOT AND SERVICE PROVIDING METHOD THEREOF

CROSS-REFERENCE TO RELATED APPLICATION

This application claims priority to and the benefit of Korean Patent Application No. 10-2019-0094826, filed on Aug. 5, 2019, the disclosure of which is incorporated herein by reference in its entirety.

BACKGROUND

1. Field of the Invention

The present invention relates to a robot and a service providing method performed by a processor included in the robot.

2. Discussion of Related Art

In order to provide various services to users more effectively, the introduction of robots in stores and the like for selling products or services is under discussion these days. Users may be provided with various kinds of information for purchasing products or services through robots disposed in stores.

Meanwhile, a plurality of users may be present in a store, and the plurality of users may be customers or workers who manages the store. According to a related art, however, a robot is not able to distinguish between customers and workers and thus is not able to effectively provide various services to the customers.

SUMMARY OF THE INVENTION

The present invention is directed to providing a method of effectively providing service to each user by determining whether a user present in a space is a guest or a host, and a robot performing the same.

The objects of the present invention are not limited to the aforementioned object. Unmentioned other objects and advantages of the present invention will be understood from the following description and may become more apparent by exemplary embodiments of the present invention. Also, it will be easily understood that the objects and advantages of the present invention may be implemented by means described in the claims and combinations thereof.

According to an aspect of the present invention, there is provided a robot for providing service in a space, the robot including a camera configured to acquire images of an internal space, a microphone configured to receive a sound generated in the internal space, a sensing unit configured to sense specific information of the internal space, and a processor configured to calculate clothing information of a first user who is in the space, location information of the first user in the space, and space entry time information of the first user on the basis of at least one of the acquired images, the received sound, and the sensed information, determine whether the first user is a guest or a host on the basis of the calculated information, determine whether the first user who has been determined as the guest is a first guest who stays in the space for a short period of time or a second guest who stays in the space for a long period of time, and determine a type of service provided by the robot on the basis of a result of the determination.

According to another aspect of the present invention, there is provided a service providing method performed by a processor included in a robot, the method including calculating clothing information of a first user who is in a space, location information of the first user in the space, and space entry time information of the first user on the basis of at least one of images acquired through a camera, a sound received by a microphone, and sensing information sensed by a sensing unit, determining whether the first user is a guest or a host on the basis of the calculated information and determining whether the first user who has been determined as the guest is a first guest who stays in the space for a short period of time or a second guest who stays in the space for a long period of time, and determining a type of service provided by the robot on the basis of a result of the determination.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the drawings so that those of ordinary skill in the art can readily implement the present invention. The present invention can be implemented in various different forms and is not limited to the exemplary embodiments set forth herein.

In order to clearly describe the present invention, irrelevant parts will be omitted. Throughout the specification, like numbers refer to like elements. Also, some embodiments of the present invention will be described in detail with reference to exemplary drawings. In assigning reference numerals to elements in each drawing, it should be noted that the same numerals are assigned to the same elements as possibly as can be even though they appear in different drawings. Also, in describing embodiments of the present invention, when a detailed description of a known related structure or function is determined to obscure the gist of the present invention, the detailed description thereof may be omitted.

In describing elements of the present invention, terms such as first, second, A, B, (a), and (b) may be used. These terms are used only to differentiate the elements from other elements, but the nature, sequence, order, number, etc. of the corresponding elements are not limited by these terms. When an element is referred to as being "connected," "coupled," or "linked" to another element, it should be understood that the element may be directly connected or linked to the other element, but another element may be "interposed" therebetween or the elements may be "connected," "coupled," or "linked" to each other via another element.

Although an element may be subdivided for the convenience of description in implementing the present invention, the subdivided elements may be implemented in one device or module, or one subdivided element may be implemented in multiple devices or modules in a distributed manner.

In this specification, a robot is a collective name of apparatuses which may perform specific functions and travel a specific area. The functions performed by the robot include various functions that may be provided by a moving apparatus, such as notification of cleaning, map building, and security functions.

Figure 1:
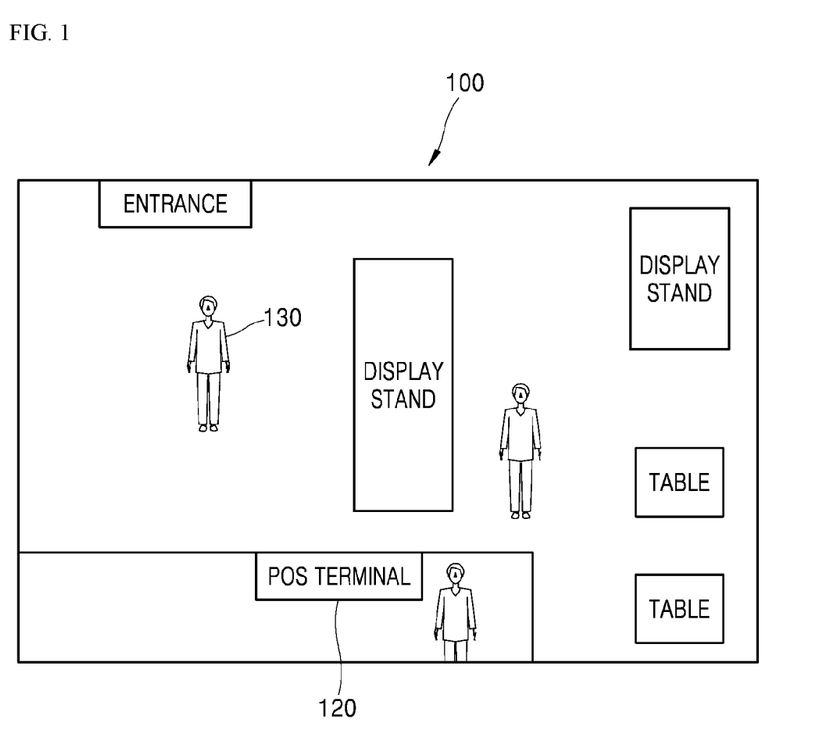
FIG. 1 is a diagram schematically showing a configuration of a store according to an exemplary embodiment of the present invention.

FIG. 1 is a diagram schematically showing a configuration of a store according to an exemplary embodiment of the present invention.

The store may be a specific space, and at least one customer (i.e., a guest) and at least one worker (i.e., a host) are present in the store. For example, the store may be a bakery, a coffee shop, a fast-food shop, a cafeteria, and the like.

Referring to FIG. 1, a plurality of users 130 are present in a store 100, and a robot 110 provides service to each of the users 130. In the store 100, a point of sales (POS) terminal 120 is located in the store 100, and a worker carries out a payment operation using the POS terminal 120.

The robot 110 determines whether each of the users 130 is a customer or a worker and may provide different services on the basis of determination results.

Figure 2:
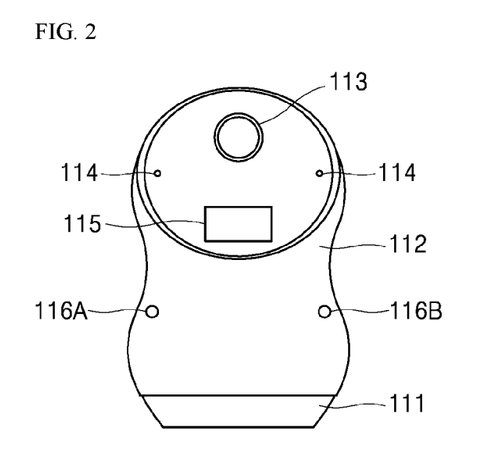
FIG. 2 shows the appearance of a robot according to an exemplary embodiment of the present invention.

FIG. 2 shows the appearance of a robot according to an exemplary embodiment of the present invention.

In FIG. 2, the robot 110 is shown as a stationary robot which does not move. However, the present invention is not limited thereto, and the following description may be applied to a moving robot. Meanwhile, a moving robot may further include a travel section (not shown).

Referring to FIG. 2, the robot 110 includes a first body 111 provided at a lower part and a second body 112 provided on the first body 111.

The first body 111 is provided to be stationary. The second body 112 rotates left or right on the first body 111, and an angle thereof is adjusted (i.e., tilts) upward or downward.

A camera 113 is installed on an upper surface of the second body 112. Therefore, the camera 113 is rotated and tilted as the second body 112 rotates and tilts.

Also, a microphone 114 and a speaker 115 are installed in the second body 112.

A sensing unit 116 may include human detecting sensors 116A and 116B and the like and may be installed on an external surface of the second body 112.

Meanwhile, a communicator, a storage, and a processor may be provided in the second body 112.

Figure 3:
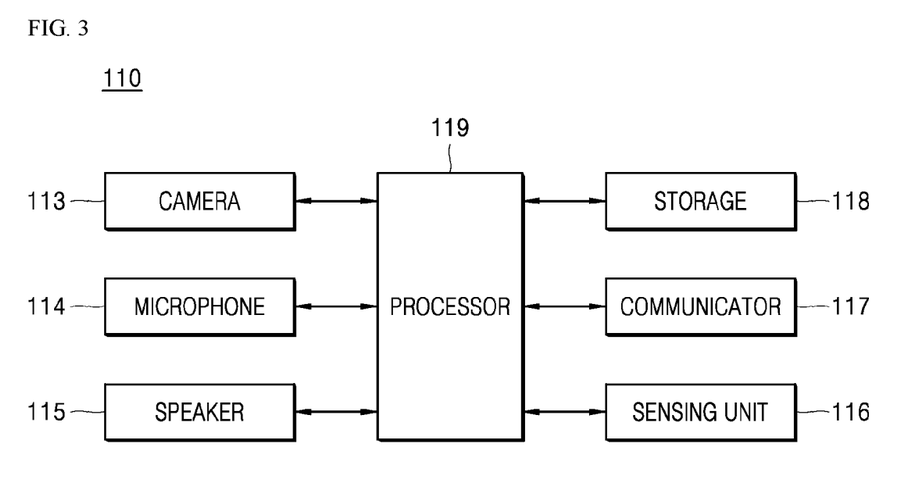
FIG. 3 is a block diagram schematically showing a configuration of a robot according to an exemplary embodiment of the present invention.

FIG. 3 is a block diagram schematically showing a configuration of the robot 110 according to an exemplary embodiment of the present invention.

Referring to FIG. 3, the robot 110 according to an exemplary embodiment of the present invention is an apparatus for providing a specific service to a user in a store and includes the above-described camera 113, microphone 114, speaker 115, and sensing unit 116, a communicator 117, a storage 118, and a processor 119.

The camera 113 acquires images of the inside of the store and is installed on the outside of the second body 112. The second body 112 may rotate left or right, and the camera 113 may be rotated along with the rotation of the second body 112. Therefore, the camera 113 may acquire images of the whole store.

The microphone 114 receives sounds generated in the store and is installed on the external surface of the second body 112.

The speaker 115 outputs a voice signal and is installed on the external surface of the second body 112. The voice signal is used to provide service to a user and is generated by the processor 119.

The sensing unit 116 includes a plurality of sensors and senses specific information in the store. For example, the sensing unit 116 may include the human detecting sensors 116A and 116B, a proximity sensor, a depth sensor, a barometric pressure sensor, an acceleration sensor, a magnetic sensor, a gravity sensor, a gyroscope, a motion sensor, an ultrasonic sensor, an optical sensor, a light detection and ranging (LiDAR) sensor, a radar, and the like.

The communicator 117 communicates with an external device such as the POS terminal 120. The communicator 117 may include a mobile communication module, a short-range communication module, and the like.

The mobile communication module exchanges wireless signals with at least one of a base station, an external terminal, and a communication server in a mobile communication network constructed according to mobile communication standards or methods, such as global system for mobile (GSM) communication, code-division multiple access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), and LTE-advanced (LTE-A).

The short-range communication module is intended for short-range communication and may support at least one of Bluetooth™, radio frequency identification (RFID), infrared data association (IrDA), ultra-wideband (UWB), ZigBee, near field communication (NFC), Wi-Fi, Wi-Fi direct, and wireless universal serial bus (USB) technologies.

The storage 118 stores various kinds of information for providing service. For example, the storage 118 may store the shape of a shop uniform in advance and store information on a past purchase history of the store 100 received through the communicator 117.

The processor 119 may include one or more of a central processing unit (CPU), an application processor, and a communication processor. The processor 119 may perform calculation or data processing for control and/or communication of at least one other element of the robot 110.

In particular, the processor 119 may determine whether each user present in the store 100 is a customer or a worker and determine a type of service provided by the robot 110 on the basis of the determination result.

More specifically, the processor 119 calculates clothing information of a user who is in the store 100, location information of the user in the store 100, and store entry time information of the user on the basis of at least one of images acquired by the camera 113, a sound received by the microphone 114, and information sensed by the sensing unit 116, determines whether the user is a customer or a worker on the basis of the calculated information, and determines whether the user who has been determined as a customer is a first customer who stays in the store 100 for a short period of time or a second customer who stays in the store 100 for a long period of time. Then, the processor 119 determines a type of service provided by the robot 110 on the basis of the determination result.

An operation of the robot 110 for providing service will be described in detail below with reference to FIGS. 4 to 6.

Figure 4:
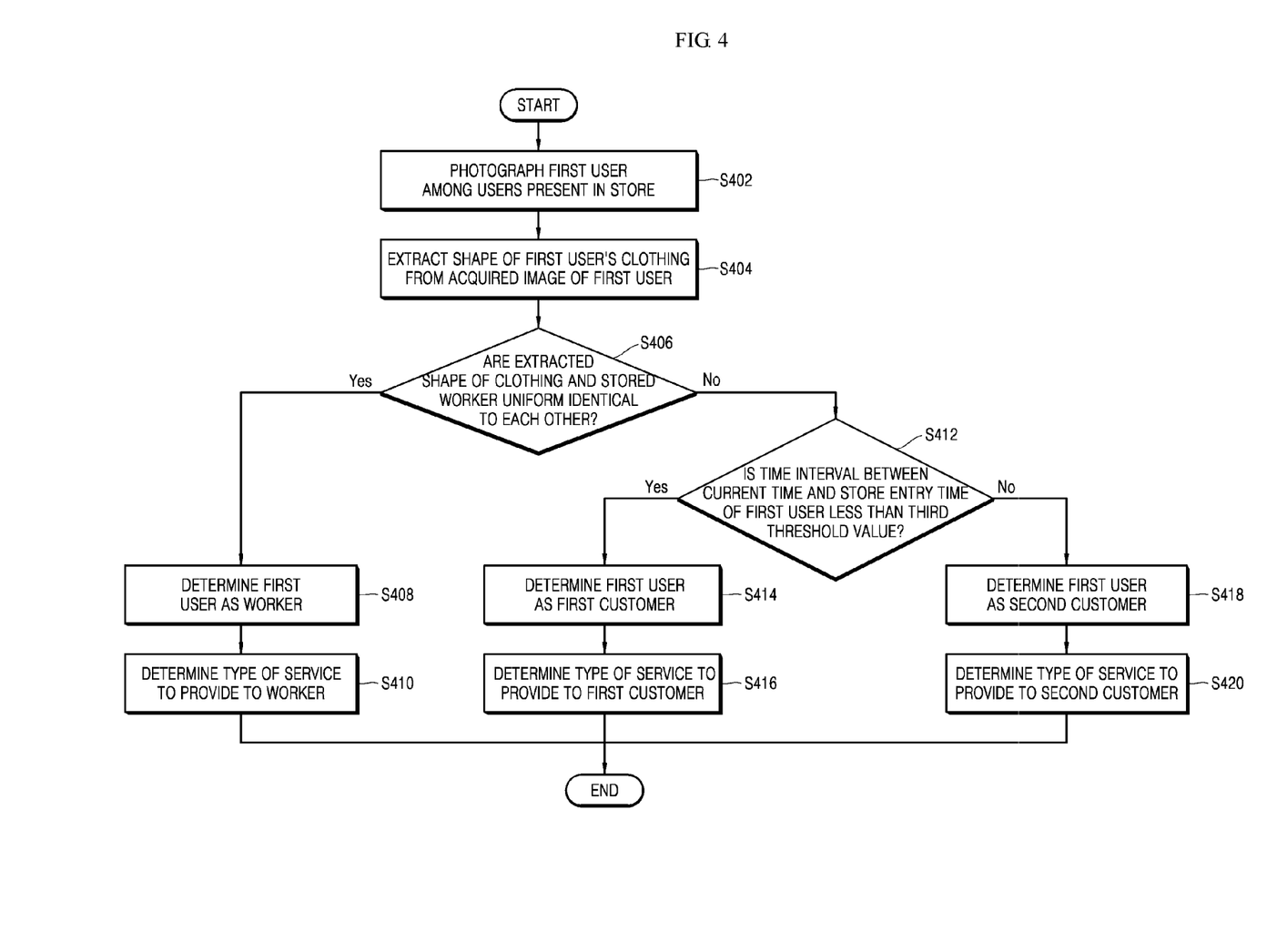
FIGS. 4 to 6 are flowcharts of a service providing method of a robot according to exemplary embodiments of the present invention.

FIG. 4 is a flowchart of a service providing method according to a first exemplary embodiment of the present invention.

It is assumed that the store 100 has a uniform for workers and the shape of the uniform has been imaged and stored in the storage 118. On entering the store 100, a user may be given a unique identification (ID), and it is possible to distinguish users from each other through IDs. For example, an ID of a user may be generated on the basis of a snapshot acquired by the camera 113.

In operation S402, the camera 113 photographs a first user among users present in the store 100.

In operation S404, the processor 119 extracts the shape of the first user's clothing from the acquired image of the first user.

For example, the processor 119 may extract feature points of the shape of the first user's clothing from the acquired image of the first user.

In operation S406, the processor 119 compares the extracted shape of the clothing with the shape of the worker uniform stored in the storage 118 and determines whether the shapes are identical to each other. For example, the processor 119 determines whether the shapes are identical to each other by comparing the extracted feature points with feature points of the worker uniform stored in the storage 118.

When the extracted shape of the clothing is identical to the shape of the worker uniform stored in the storage 118, the processor 119 determines that the first user is a worker in operation S408. Then, in operation S410, the processor 119 determines a type of service to provide to the worker.

According to an exemplary embodiment of the present invention, when the first user is a worker, the robot 110 may provide a guide service regarding stocks of products in the store 100, a guide service regarding whether cleaning is required, a payment assist service, and the like.

As an example, when the store 100 is a bakery, the robot 110 may take inventory of bread placed on display stands and output a message indicating the lack of certain kinds of bread through the speaker 115. In this case, the robot 110 may register the layout of bread placed on display stands in advance and take inventory of bread using images acquired by the camera 113 and distances between the robot 110 and bread sensed by a distance sensor (e.g., a depth sensor) together with the registered layout.

As another example, when the store 100 is a coffee shop, the robot 110 may determine whether there is trash on a table in the store 100 and output a notification that cleaning is required through the speaker 115 when there is trash. In this case, the storage 118 stores a shape of the table on which there is no trash in advance, and the robot 110 may determine whether cleaning is required by comparing a shape of the table imaged by the camera 113 and the stored shape of the table. Meanwhile, when it is determined by analyzing a acquired image that there is no user around the table and an object is present on the table, the processor 119 may determine that cleaning is required.

As another example, the robot 110 may provide the payment assist service for informing a worker which type of product that a customer holds in his or her hand is on the basis of an image acquired by the camera 113.

On the other hand, when the extracted shape of the clothing differs from the shape of the worker uniform stored in the storage 118, the processor 119 determines that the first user is a customer. In operation S412, it is determined whether the customer is a first customer or a second customer.

A first customer is a customer who stays in the store for a short period of time, and a second customer is a customer who stays in the store for a long period of time. For example, when the store 100 is a coffee shop or a bakery, a first customer is a customer who purchases a product and then leaves the store 100 right away, and a second customer is a customer who purchases a product and then stays in the store 100.

To this end, in operation S412, the processor 119 determines whether a time interval between a current time and the first user's store entry time is less than a third threshold value.

When the time interval between the current time and the first user's store entry time is less than the third threshold value, the processor 119 determines that the first user as a first customer in operation S414. Then, in operation S416, the processor 119 determines a type of service to provide to the first customer.

According to an exemplary embodiment of the present invention, when the first user is a first customer, the robot 110 may provide a service for recommending a product in the store 100 based on purchase histories of past customers in the store 100, a zone guide service for the store 100, and the like.

For example, the processor 119 may read information of a purchase history of a past customer at the same time of a past day as the current time from the storage 118 or receive information of the purchase history through the communicator 117 and determine a recommended product in the store 100 for the first user who is a customer on the basis of the information. The purchase history information of a past customer includes information on purchased products and may further include type information of the past customer (e.g., sex and age). In other words, the processor 119 may recommend the first user a product on the basis of information on products purchased by a past customer of the same sex and age as the first user.

On the other hand, when the time interval between the current time and the first user's store entry time is greater than or equal to the third threshold value, the processor 119 determines that the first user as a second customer in operation S418. Then, in operation S420, the processor 119 determines a type of service to provide to the second customer.

According to an exemplary embodiment of the present invention, the service of the robot 110 provided when the first user is the second customer may be a service for recommending a product different from a product purchased at the time of entering the store 100. In other words, the processor 119 may receive information on the product that the first user has purchased upon entering the store 100 from the POS terminal 120 and recommend other product on the basis of the received information. Also, the processor 119 may recommend other products by further using information on a purchase history of a past customer.

Meanwhile, the first user who is a customer may visit the store 100 alone or in a group. In this case, the processor 119 may determine a recommendation service of a product provided by the robot 110 according to the type of the group.

More specifically, groups include a first group, a second group, and a third group.

The first group includes only the first user who has visited the store alone. The second group includes two customers of different sexes. In other words, the first user and another user of a different sex than the first user belong to the second group. For example, the other user of the second group may be the first user's lover.

The third group includes the first user and two or more other users.

In other words, the product that a user purchases in a store is different depending on whether the first user visits the store alone, visits with lover, or visits in the group. Therefore, the processor 119 may determine a recommendation service of a product provided by the robot 110 according to the type of the group. Therefore, the processor 119 may classify and provide a product recommendation service according to a group type.

The processor 119 may analyze images including the first user and include another user in the group when the other user in the store 100 looks at the first user for a preset period of time or more. The preset period of time may be three seconds or more.

In most cases, people look at other people to talk with the other people. Therefore, it is possible to determine a person who looks at the first user's body as a person included in the customer group. Since a person who is not a member of a group may look at another person for a short period of time, the processor 119 does not include a person who looks at the first user for less than the preset period of time in the group and includes a person who looks at the first user for the preset period of time or more in the group.

Also, the processor 119 may analyze images including the first user and determine sexes of users belonging to the group on the basis of hair lengths of the users and whether an object of a color different from that of hair is attached to the hair.

For example, when one user belonging to the group has hair extending down to the neck or below and a hair pin of a color different from that of the hair is attached to the hair, the processor 119 may determine that the user is a female user.

Meanwhile, the store entry time of the first user may be acquired in various ways.

According to an exemplary embodiment of the present invention, the processor 119 may determine whether a door at the entrance of the store 100 is opened on the basis of at least one of an image acquired by the camera 113 and a sound received by the microphone 114. When the distance between the first user and the entrance gradually increases after the door is opened, it is possible to determine that the first user enters the store 100. Also, the processor 119 may calculate the time at which the door has been opened as the store entry time of the first user.

The distance between the first user and the entrance may be sensed by a distance sensor (e.g., a LiDAR sensor) included in the sensing unit 116. The sound received by the microphone 114 may be a sliding sound generated when the door is opened, a sound of a person passing through an air curtain attached to the door, or the like.

According to another exemplary embodiment of the present invention, the processor 119 may calculate a user's store entry time on the basis of a sensing value sensed by a human detecting sensor attached to the robot 110.

More specifically, as mentioned above, the sensing unit 116 includes the first human detecting sensor 116A and the second human detecting sensor 116B installed on a front side of the robot 110. When the robot 110 is disposed close to the entrance, the first human detecting sensor 116A is disposed closer to the entrance of the store 100 compared to the second human detecting sensor 116B.

When the first user passes in front of the robot 110 disposed at the entrance, the first human detecting sensor 116A and the second human detecting sensor 116B sense the first user. In this case, if the first user is sequentially sensed by the first human detecting sensor 116A and the second human detecting sensor 116B, the processor 119 determines that the first user enters the store 100, and if the first user is sequentially sensed by the second human detecting sensor 116B and the first human detecting sensor 116A, the processor 119 determines that the first user leaves the store 100. When the first user is sequentially sensed by the first human detecting sensor 116A and the second human detecting sensor 116B, the processor 119 may calculate a time at which the first human detecting sensor 116A has sensed the first user as the store entry time of the first user.

Figure 5:
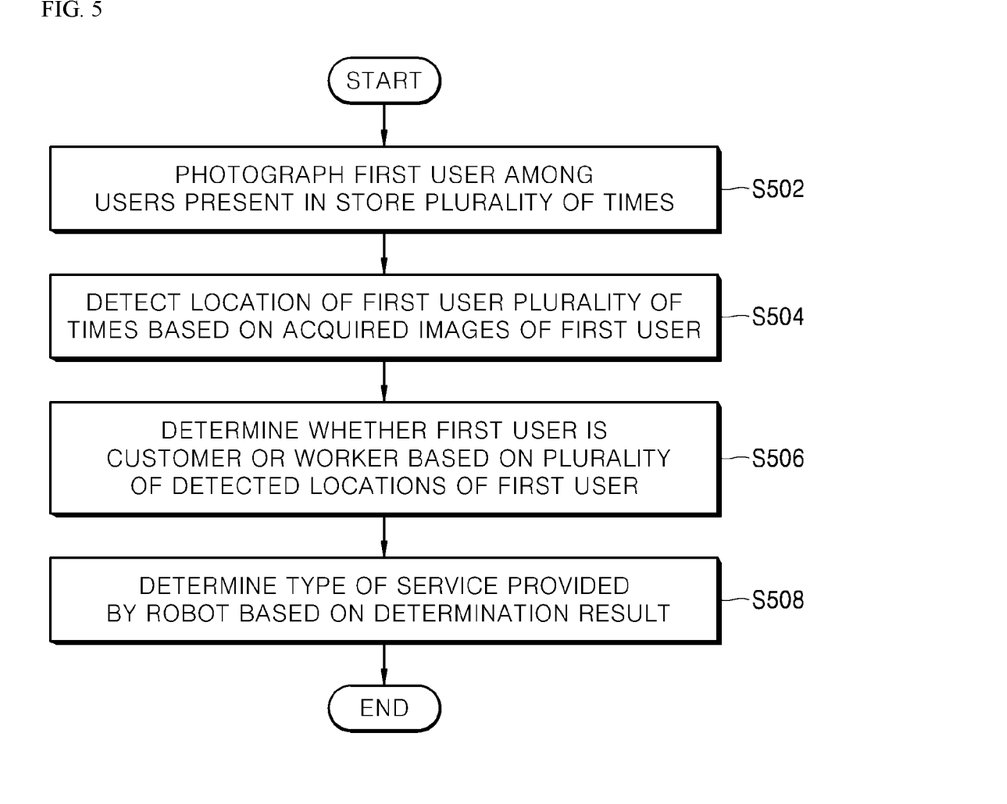

FIG. 5 is a flowchart of a service providing method according to a second exemplary embodiment of the present invention.

It is assumed that the store 100 does not have a uniform for workers and the shape of a uniform is not stored in the storage 118.

In operation S502, the camera 113 photographs a first user among users present in the store 100 a plurality of times.

In operation S504, the processor 119 detects the location of the first user a plurality of times on the basis of the acquired images of the first user.

The store 100 is divided into a first zone and a second zone on the basis of the POS terminal 120. The first zone is a worker zone in which workers are present, and the second zone is a customer zone in which customers are mainly present. The second zone is larger than the first zone. Therefore, the processor 119 determines whether the first user is in the first zone or the second zone on the basis of the plurality of acquired images of the first user.

For example, the robot 110 is generally disposed in a zone between the POS terminal 120 and the entrance, and the processor 119 detects the location of the POS terminal 120 through a distance sensor (e.g., a depth sensor). In this case, the processor 119 determines a zone which is present at a longer distance than the POS terminal 120 as the first zone and determines the inside of the store 100 other than the first zone as the second zone.

In operation S506, the processor 119 determines whether the first user is a customer or a worker on the basis of the plurality of detected locations of the first user.

According to an exemplary embodiment of the present invention, the processor 119 may determine the first user as a worker when the number of times that the first user has been present in the first zone is greater than the number of times that the first user has been present in the second zone by a first threshold value or more. Also, the processor 119 may determine the first user as a customer when the number of times that the first user has been present in the second zone is greater than the number of times that the first user has been present in the first zone by a second threshold value or more. The first threshold value and the second threshold value may be set in proportion to the number of times that the location of the first user has been detected.

For example, when the number of times that the location of the first user has been detected is 10, the first threshold value may be 8, and when the number of times that the location of the first user has been detected is 20, the first threshold value may be 16. Also, when the number of times that the location of the first user has been detected is 10, the second threshold value may be 9, and when the number of times that the location of the first user has been detected is 20, the second threshold value may be 18. Meanwhile, when the number of times that the location of the first user has been detected is 10 and the number of times that the first user has been detected in the first zone is 9, the processor 119 may determine the first user as a customer.

Meanwhile, in operation S506, when the first user is a customer, the processor 119 additionally determines whether the first user is a first customer or a second customer. This is the same as described above, and thus detailed description thereof will be omitted.

In operation S508, the processor 119 determines a type of service provided by the robot 110 on the basis of the determination result. The robot 110 provides the determined service to the first user. This is the same as described above, and thus detailed description thereof will be omitted.

Figure 6:
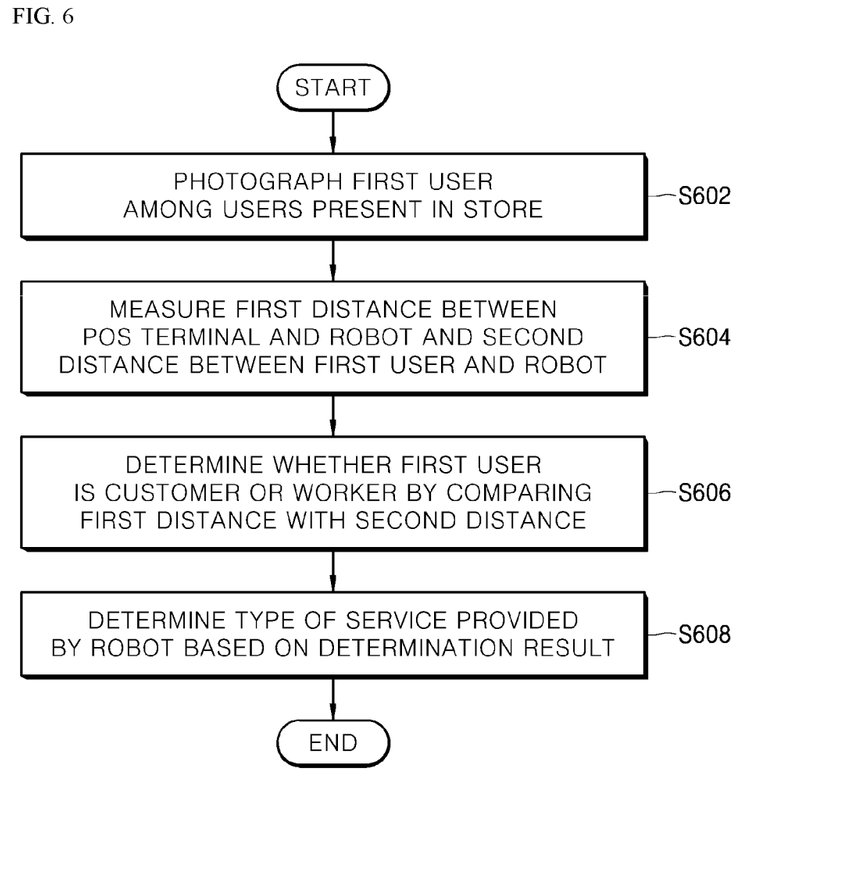

FIG. 6 is a flowchart of a service providing method according to a third exemplary embodiment of the present invention.

It is assumed that the store 100 does not have a uniform for workers and the shape of a uniform is not stored in the storage 118. Also, the robot 110 is assumed to be disposed in a zone between the POS terminal 120 and the entrance.

In operation S602, the camera 113 photographs a first user among users present in the store 100.

In operation S604, a distance sensor in the sensing unit 116 measures a first distance between the POS terminal 120 located in the store 100 and the robot 110 and a second distance between the first user and the robot 110.

In operation S606, the processor 119 determines whether the first user is a customer or a worker by comparing the first distance with the second distance. In other words, the processor 119 determines the first user as a worker when the first distance is shorter than the second distance and determines the first user as a customer when the first distance is longer than the second distance.

Meanwhile, in operation S606, when the first user is a customer, the processor 119 additionally determines whether the first user is a first customer or a second customer. This is the same as described above, and thus detailed description thereof will be omitted.

In operation S608, the processor 119 determines a type of service provided by the robot 110 on the basis of the determination result. The robot 110 provides the determined service to the first user. This is the same as described above, and thus detailed description thereof will be omitted.

In brief, FIGS. 4 to 6 illustrate that the processor 119 calculates clothing information of a first user who is in the store 100, location information of the first user in the store 100, and store entry time information of the first user on the basis of at least one of an image acquired by the camera 113, a sound received by the microphone 114, and sensing information sensed by the sensing unit 116 and determines which one of a worker, a first customer, and a second customer the first user is on the basis of the calculated information. Also, the processor 119 determines a type of service provided by the robot 110 on the basis of the determination result and provides the determined service. Accordingly, it is possible to efficiently provide service to each user.

According to an exemplary embodiment of the present invention, it is possible to efficiently provide service to each user by determining whether the user in a space is a guest or a worker.

Effects of the present invention are not limited to that described above and various other effects of the present invention may be derived from the configuration of the present invention by those of ordinary skill in the art.

Although all the elements of an exemplary embodiment of the present invention are described as being combined into one entity or operating in combination, the present invention is not limited to the embodiment, and all the elements may be selectively combined into at least one entity and then operated within the scope of the present invention. Also, each of all the elements may be implemented as one independent piece of hardware, but some or all of the elements may be selectively combined to be implemented as a computer program including a program module which performs some or all functions which are combined in one or more pieces of hardware. Codes and code segments which constitute the computer program may be easily deduced by those of ordinary skill in the art. Such a computer program is stored in computer readable media and read and executed by a computer to implement the exemplary embodiment of the present invention. A storage medium of the computer program may include a magnetic recording medium, an optical recording medium, and a semiconductor recording medium. Also, the computer program for implementing the exemplary embodiment of the present invention includes a program module which is transmitted in real time through an external device.

Although exemplary embodiments of the present invention have been described above, various modifications or alterations can be made by those of ordinary skill in the art without departing from the scope of the present invention. Therefore, these modifications and alterations are considered to fall within the scope of the present invention.

What is claimed is:

1. A robot comprising:
   a camera configured to acquire images of an internal space;
   a microphone configured to receive a sound generated in the internal space;
   a sensing unit configured to sense specific information of the internal space; and
   a processor configured to:
   calculate clothing information of a first user who is in the space, location information of the first user in the space, and space entry time information of the first user on the basis of at least one of the acquired images, the received sound, and the sensed information,
   determine whether the first user is a guest or a host of the space on the basis of the calculated information,
   determine whether the first user who has been determined as the guest is a first guest who stays in the space for a short period of time or a second guest who stays in the space for a long period of time, and
   determine a type of service provided by the robot on the basis of a result of the determination.

2. The robot of claim 1, further comprising a storage configured to store a shape of host uniforms,
   wherein the processor extracts a shape of the first user's clothing from the acquired images and determines whether the first user is the guest or the host by comparing the extracted clothing shape with the stored shape of host uniforms.

3. The robot of claim 2, wherein when the shape of host uniforms is not stored in the storage, the processor detects a location of the first user in the space a plurality of times on the basis of the acquired images and determines whether the first user is the guest or the host on the basis of the plurality of detected locations of the first user, and
   a point of sales (POS) terminal is disposed in the space, the space is divided into a first zone and a second zone based on a location of the POS terminal, and the second zone has a larger size than the first zone.

4. The robot of claim 3, wherein the processor determines the first user as the host when the number of times that the first user has been present in the first zone is greater than the number of times that the first user has been present in the second zone by a first threshold value or more, and determines the first user as the guest when the number of times that the first user has been present in the second zone is greater than the number of times that the first user has been present in the first zone by a second threshold value or more.

5. The robot of claim 2, wherein the sensing unit includes a distance sensor configured to measure a first distance between the POS terminal located in the space and the robot and a second distance between the first user and the robot,
when the shape of host uniforms is not stored in the storage, the processor determines whether the first user is the guest or the host by comparing the first distance with the second distance, and
the processor determines the first user as the host when the first distance is shorter than the second distance and determines the first user as the guest when the first distance is longer than the second distance.

6. The robot of claim 1, wherein the processor determines the first user as the first guest when a time interval between a current time and a space entry time of the first user determined as the guest is less than a third threshold value and determines the first user as the second guest when the time interval is greater than or equal to the third threshold value.

7. The robot of claim 1, wherein the sensing unit includes a distance sensor configured to sense a distance between the first user and an entrance of the space, and
the processor determines whether a door at the entrance of the space is opened on the basis of at least one of the acquired images and the received sound, and
when the measured distance gradually increases after the door is opened, the processor determines that the first user enters the space and calculate a time at which the door has been opened as a space entry time.

8. The robot of claim 1, wherein the sensing unit includes a first human detecting sensor and a second human detecting sensor installed on a front side of the robot,
the first human detecting sensor is disposed closer to an entrance of the space compared to the second human detecting sensor, and
when the first user passing in front of the robot disposed at the entrance is sequentially sensed by the first human detecting sensor and the second human detecting sensor, the processor determines that the first user enters the space and calculates a time at which the first human detecting sensor has sensed the first user as the space entry time.

9. The robot of claim 1, wherein the space is a store, the guest is a customer of the store, and
the host is a worker of the store.

10. The robot of claim 9, wherein when the first user is the host, the service is a guide service regarding stocks of products in the space or a guide service regarding whether the space requires cleaning.

11. The robot of claim 9, wherein when the first user is the first guest, the service is a service for recommending a product in the space on the basis of purchase histories of past guests of the space or a guide service for the space.

12. The robot of claim 9, wherein when the first user is the second guest, the service is a service for recommending a product different from a product that the first user has purchased on entering the space.

13. The robot of claim 9, wherein when the first user is the guest, the processor determines a type of guest group including the first user by analyzing images including the first user and determines a type of service provided by the robot on the basis of the determined type of guest group, and
the type of guest group includes a first guest group including only the first user, a second guest group including the first user and another user of a different sex from the first user, and a third guest group including the first user and two or more other users.

14. The robot of claim 13, wherein the processor analyzes the images including the first user and includes other user in the guest group when the other user in the space looks at the first user's body for a preset period of time or more.

15. The robot of claim 13, wherein the processor analyzes the images including the first user and determines sexes of users belonging to the guest group on the basis of hair lengths of the users and whether an object of a color different from that of hair is attached to the hair.

16. A service providing method performed by a processor included in a robot, the service providing method comprising:
calculating clothing information of a first user who is in a space, location information of the first user in the space, and space entry time information of the first user on the basis of at least one of images acquired through a camera, a sound received by a microphone, and sensing information sensed by a sensing unit;
determining whether the first user is a guest or a host on the basis of the calculated information and determining whether the first user who has been determined as the guest is a first guest who stays in the space for a short period of time or a second guest who stays in the space for a long period of time; and
determining a type of service provided by the robot on the basis of a result of the determination.

* * * * *